United States Patent [19]

Cayzac

[11] 3,997,901
[45] Dec. 14, 1976

[54] METHOD OF DIRECTING AN AERIAL TO A RECEIVER ACCORDING TO A MAIN DIRECTION

[75] Inventor: Jacques Claude Cayzac, La Varenne, France

[73] Assignee: U.S. Philips Corporation, New York, N.Y.

[22] Filed: Dec. 31, 1974

[21] Appl. No.: 537,691

Related U.S. Application Data

[63] Continuation of Ser. No. 382,399, July 25, 1973, abandoned, which is a continuation of Ser. No. 155,912, June 23, 1971, abandoned.

[30] Foreign Application Priority Data

June 23, 1971 France .......................... 71.655912

[52] U.S. Cl. .................. 343/100 CS; 343/100 AD; 343/109; 343/226; 343/227
[51] Int. Cl.² .......................................... G01S 1/14
[58] Field of Search ............. 343/100 CS, 100 AD, 343/107, 108 R, 109, 226, 227

[56] References Cited

UNITED STATES PATENTS

| | | | |
|---|---|---|---|
| 2,730,710 | 1/1956 | Loeb | 343/16 LS |
| 2,859,440 | 11/1958 | Begovich et al. | 343/108 R |
| 3,341,707 | 9/1967 | Wingfield et al. | 343/100 CS |
| 3,505,676 | 4/1970 | Perkins | 343/107 |
| 3,560,977 | 2/1971 | Cayzac | 343/100 CS |
| 3,772,701 | 11/1973 | Wilkinson | 343/100 CS |

FOREIGN PATENTS OR APPLICATIONS 1,463,116  11/1965  France

*Primary Examiner*—Maynard R. Wilbur
*Assistant Examiner*—Richard E. Berger
*Attorney, Agent, or Firm*—Frank R. Trifari; Henry I. Steckler

[57] ABSTRACT

An apparatus for directing an antenna has an information signal being emitted in a main direction from the antenna. Two auxiliary signals are transmitted symmetrically about the antenna, from which an error signal can be derived for alignment of the antenna.

10 Claims, 6 Drawing Figures

METHOD OF DIRECTING AN AERIAL TO A RECEIVER ACCORDING TO A MAIN DIRECTION

This is a continuation of application Ser. No. 382,399, filed July 25, 1973, now abandoned, which in turn is a continuation of application Ser. No. 155,912, filed June 23, 1971, now abandoned.

The invention relates to a method of directing an aerial, transmitting information and auxiliary signals received from a transmitter, to a receiver according to a main direction, an error signal being obtained by comparing two signals received from the aerial, these signals being transmitted according to directions which are situated symmetrically with respect to the main direction.

A device of this kind is particularly, though not exclusively, intended for use in television reporting vans, where one or more mobile cameras are connected in a wireless manner to a relay station mounted on a van from where the transmission of the signals received from the cameras to the aerial of the transmitting station is effected. Hereinafter, transmitter is to be understood to mean the mobile point of the connection (camera) and receiver is to be understood to mean the stationary or semistationary point (van). If a transmission path of this kind is established in an area where obstacles are present, the reflections of the wireless signal from these obstacles are translated into interference of the received signal.

The consequences of the undesired reflections can be considerably reduced by using direction aerials and a control device for said aerials so that the transmitter and the receiver aerial are always directed to each other, independent of any rotation of the transmitter.

A device of this kind is described in the French Pat. No. 1,463,116, in which the mobile transmitter comprises an angle modulator for LF-modulation of the main lobe of the transmitter aerial, said modulation, after reception and after amplitude detection of the HF-signal, passing a filter which is tuned to the fundamental frequency, the phase of the output signal of the filter being compared in a phase discriminator with the phase of a referance signal, the output voltage of this discriminator constituting the error voltage applied to the amplifier of said control device.

Even through it operates satisfactorily for transmitting a black-and-white television signal, this device offers inadequate protection against echoes of colour television signals. Actually, it increases the angle at which echoes can occur and it introduces a parasitic frequency modulation having a frequency which is equal to the angle modulation of the beam, said modulation causing the generation of varying reflections. For practical reasons the transmitter aerial is to occupy little space and for carrier frequencies of 1 to 2 GHZ, which are particularly suitable for this kind of connections, the overall direction variation is not to exceed 20° when the relevant aerials are moved.

The invention utilizes the necessary existence of a connection between van and camera-man, this connection having a small informaton capacity and permitting continuous retransmission of the necessary information for controlling the transmitter aerial.

In accordance with the invention a method of directing an aerial, transmitting information and auxiliary signals received from a transmitter, to a receiver according to a main direction, an error signal being obtained by comparing two signals received from the aerial, these signals being transmitted according to directions which are situated symmetrically with respect to the main direction, is characterized in that the information signals are transmitted according to the main direction and the error signal is derived from the two auxiliary signals. In the case of television, the signal is composed of, for example, sychronizing signals and the so-termed picture signal. In a complete television signal certain signals, such as the first two lines after the post-equalizing interval of each field, contain no picture information. It is possible to use two of these lines for transmitting the auxiliary information to be described hereinafter. According to the present invention, the error will be measured on the basis of two line signals selected during the flyback period of the field.

In an aerial having circular polarization, the beam to be transmitted can be obtained by means of two circularly polarized radiating elements. Under these conditions, the direction of the main lobe is a function of the mutual phases in which the radiating elements are excited. Consequently, the angular modulation of the main lobe can be realized very simply by known means by introducing adjustable delays in the uspply paths of the signals to the radiating elements.

This can be effected, for example, by inserting a phase-shifter, containing ferrite and representing the adjustable line lengths, in these paths.

In accordance with the invention, the measuring time of the error, amounting to less than ½ ms, is slightly less than the duration of the fading.

The error information is each time rechecked in the rhythm of the field, which is effected once every 1/50 s in accordance with the European standard. This time is less than the response time of the direction mechanism of the aerial. In order that the invention may be readily carried into effect, one embodiment thereof will now be described in detail, by way of example, with reference to the accompanying diagrammatic drawings, in which FIG. 1 shows the commutation of the lobes.

Figure 1:
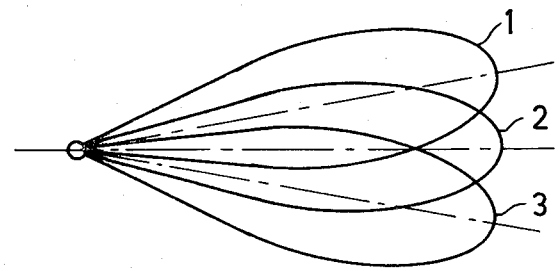

The commutation of the lobe shown in FIG. 1 is generally known. In accordance with the invention, a circularly polarized aerial having an angle of aperture of 20° is preferably used, said aerial consisting of two radiating elements which are excited by a device enabling variation of the mutual phase of the excitation of these radiating elements. The variation of the mutual phase of excitation determines the angle at which the beam is transmitted. This beam takes in the position 2 during the duration of a picture field, said position being called main direction in this context. The position 1 is a position which has been shifted, for example, through + 10°, and the position 3 is a position which has been shifted, for example, through −10° with respect to the main direction.

During one line of the field flyback the aerial transmits according to position 1, and subsequently according to the direction 3 for the duration of the next line of the field flyback.

This commutation of the lobe can be realized by means of electronic modulators enabling very fast switching of the direction of the beam.

One of the most important advantages of the invention is that the aerial is properly directed during transmission of the useful television signal.

Figure 2:
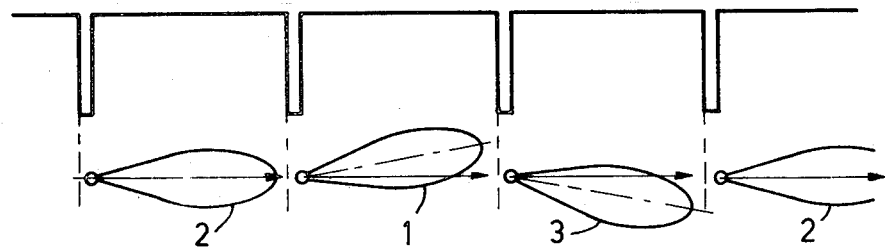
FIG. 2 shows the signals received by the receiver during two lines of the flyback field, as a function of the position of the lobes.

The top part of FIG. 2 shows the synchronizing signals of the television signal, the reference numerals of the line signals referring to the direction of the aerial shown in the lower part of the Figure.

Figure 3:
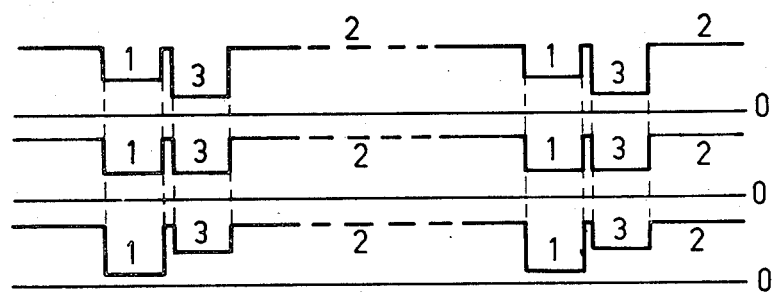
FIG. 3 shows the field strength received by the receiver for a wave of constant transmitted amplitude (for example, frequency modulation).

FIG. 3 shows the received signals for the three possible directions for a transmitted wave of constant amplitude.

In $a$ the direction error is negative. If the beam occupies the direction 1, the received signal has a lower level in an absolute sense than that received if the beam occupies the direction 3. In $b$ the error is zero and the attenuation of the signal is the same for the two symmetrical positions during one line period. In $c$. the error is positive and the inverse situation occurs as shown in $a$.

The determination of the sense and the magnitude of the error can be obtained in the same manner as described in the French Pat. No. 1,463,116. If an amplitude-modulated signal is transmitted, it is necessary to have an identification circuit for the two lines used in order to measure the direction error which identification circuit is controlled by the synchronizing signals.

If a frequency-modulated television signal is transmitted, in principle no video identification is required as the transmitted HF signal has a constant amplitude during the field. A pulse will be received having a length corresponding to a duration of 20 ms in the direction 2, followed by two short pulses 1 and 3 having a duration which is slightly less than 64 $\mu s$.

Figure 4:
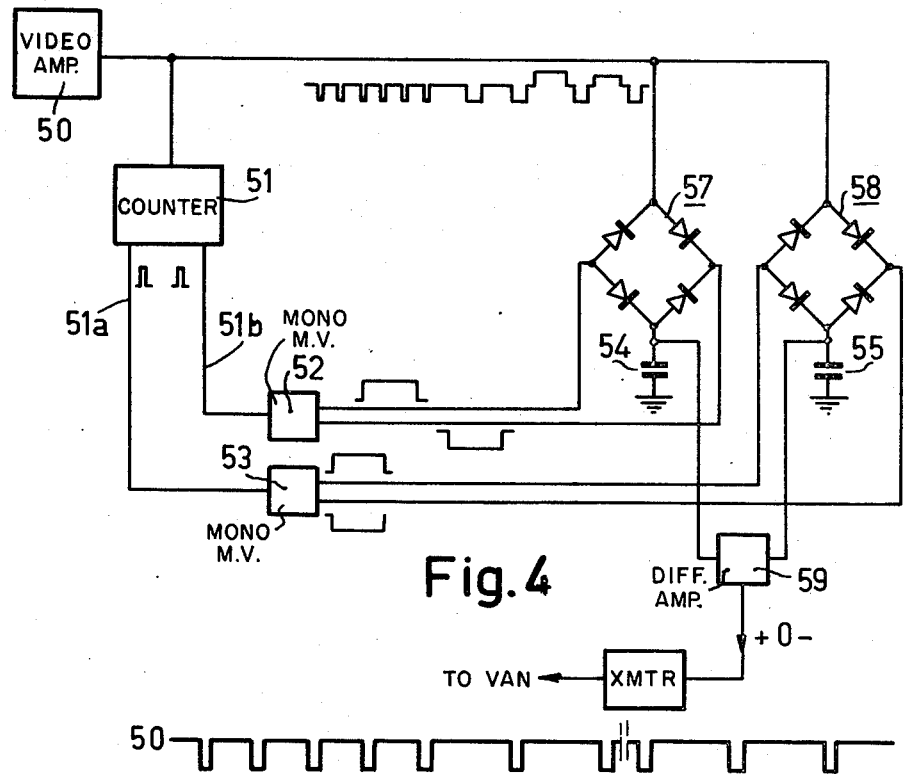
FIG. 4 shows a diagram of a direction-error detector.
Figure 5:
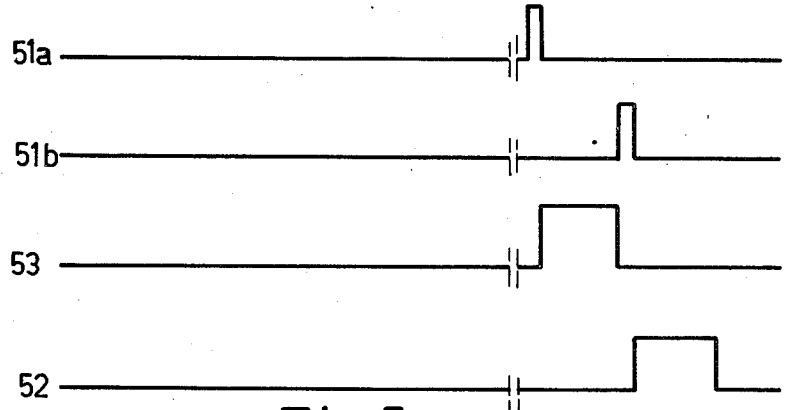
FIG. 5 shows the signals liable to occur at different points in the circuit arrangement of FIG. 4.

The circuit arrangement shown in FIG. 4 has been designed for the reception of an amplitude-modulated signal. The signals occurring at various points in this circuit arrangement are shown in FIG. 5. If the amplitude is not constant, the level of the signal cannot characterize the direction error if no special measures are taken. The two monostable flipflops 52 and 53 release two diode bridges 57 and 58 allowing a measuring signal to pass. This measuring signal is derived directly from the output of the video amplifier 50. During transmission of two black lines of the flyback field a constant grey level is artificially introduced, said grey level being given a variable amplitude as a function of the direction error, said amplitude being translated into different voltages which are applied to the capacitors 54 and 55. The voltages will actually be equal if the direction error is zero, which is the object of the device. In order to open the bridges 57 and 58 at the correct instant, the trigering of the monostable flipflops is controlled by means of two trigger pulses 51$a$ and 51$b$ originating from a stage 51, the input of which is connected to the output of the video amplifier 50. The stage 51 is a counting device which produces a pulse when the $n^{th}$ line pulse of the flyback field occurs, and which produces a second pulse at the $(n+1)^{th}$ line pulse. The choice of the two successive lines is arbitrary, provided that these lines are not occupied. The line pulses are counted after the post-equalizing pulses.

Figure 6:
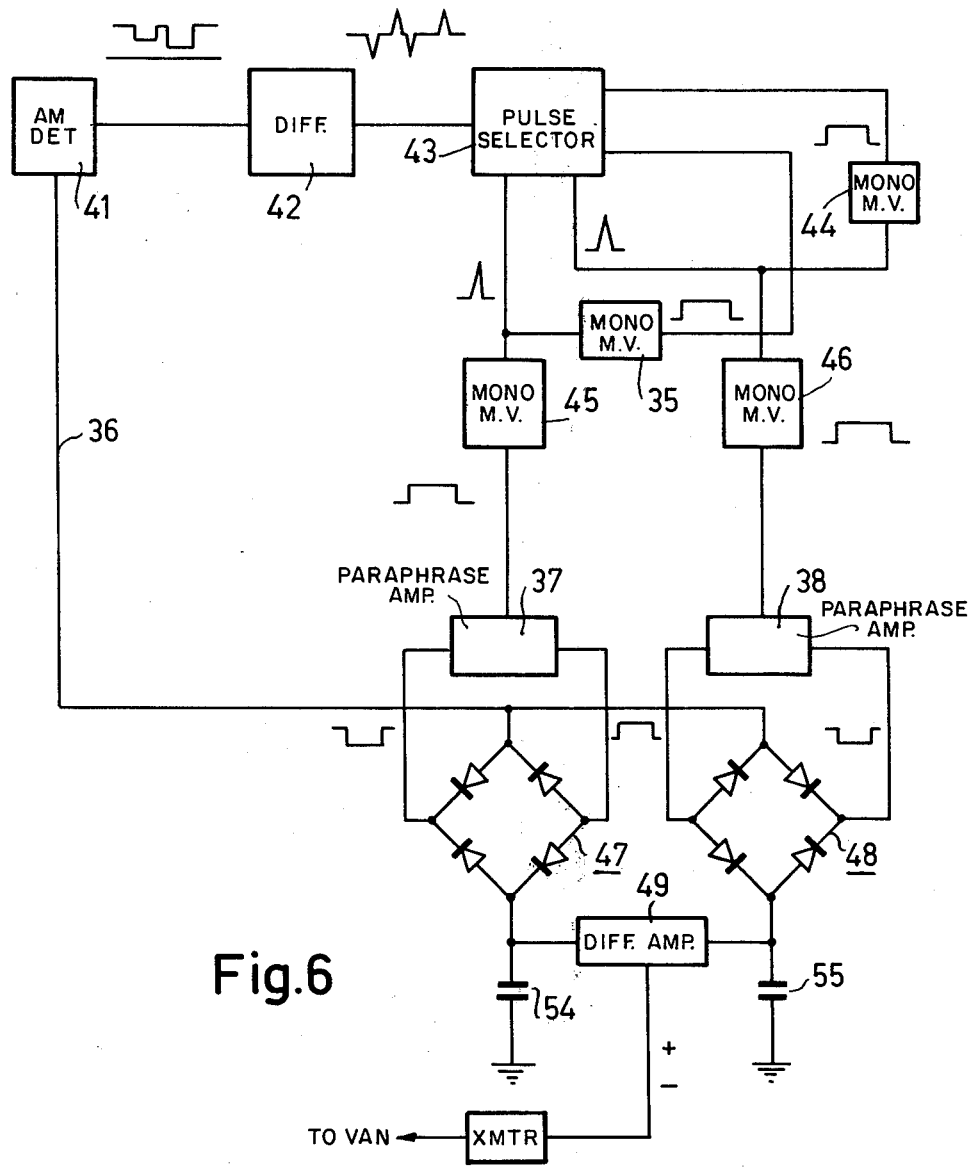
FIG. 6 shows another diagram which is useful if the transmission is realized by means of frequency modulation.

If the signal is frequency modulated, the circuit arrangement shown in FIG. 6 may be used. This circuit offers the advantage that there is no need for a circuit for regaining the synchronization. Circuits of this kind are known, but they are comparatively complicated.

The amplitude of the frequency-modulated signal is detected in 41 before it is limited in the intermediate-frequency circuit. The edges corresponding to the amplitude variations caused by the direction error of the aerials, are coverted in the differentiator 42 into a series of four pulses which are alternatively negative and positive. The polarities of these pulses may, however, be opposed for the important direction errors, in which case the received signal of a lobe 1 or 3 is larger than the signal received in direction 2.

The pulse selector 43 supplies the pulses 1 and 3 separately, said pulses serving for controlling the setting of the monostable flipflops 45 and 46, the set state of which covers slightly less than one line period. The signal supplied by each of the two monostable flipflops is applied to the input of paraphase amplifiers 37 and 38 which supply, during the operation of the monostable flipflops, two symmetrical signals maintaining the bridges 47 and 48 conducting, thus permitting the supply of the corresponding signal originating from 41 via the intermediate conductor 36, said signal being treated in the manner described above. In normal circumstances the signal supplied by the pulse selector is to be composed of the 4 pulses, and the selector is to be sensitive to the two polarities of the pulses. This selection circuit is to return to zero after four pulses. For this purpose a zero-resetting device is provided, consisting of a monostable flipflop 35 whose return period to its initial state is approximately equal to the duration of two line periods. In the case or erroneous information or the temporary absence of information, the selector is, therefore, automatically set to zero.

In order to ensure a considerable insensitivity to any stray pulses, a monostable flipflop ensures that the selector is inhibited after each information during a period of time which is slightly less than one field time. The design of the transmitter for the error information, occuring in the form of a direct voltage, is not described. It is obvious that the information relating to the direction error is to be transmitted to a mechanical assembly capable of reducing or eliminating this error. The information containing the direction error can be transmitted advantageously by utilizing the path consisting of known means and existing between the camera man and the control desk in the van.

What is claimed is:

1. A circuit comprising input means for receiving a transmitted signal from a transmitter having a main transmission direction during an information content portion of said transmitted signal and two other directions symmetrical with respect to said main direction during an auxiliary signal portion distinct in time from said main signal portion, and means coupled to said input means for producing an error signal from said auxiliary signals.

2. A circuit as claimed in claim 1 wherein said producing means comprises a pair of capacitors, means coupled to said receiving means and to said capacitors for alternately coupling said capacitors for receiving the auxiliary signals respectively, and a difference amplifier having a pair of inputs coupled to said capacitors respectively and an output means for supplying said error signal.

3. A circuit as claimed in claim 2 wherein said alternately coupling means further comprises a pair of diode bridges coupled between said receiving means and said capacitors respectively and means coupled to said receiving means and said bridges for alternately enabling said bridges.

4. A circuit as claimed in claim 3 wherein said transmitted signal has sychronizing pulses and said producing means further comprises a counter means coupled to said receiving means for counting said synchronizing pulses and for producing enabling pulses and said enabling means comprises a pair of monostable circuits coupled to said counting means and to said bridges respectively.

5. A circuit as claimed in claim 1 wherein said input means receives a transmitted television signal and receives said auxiliary signals during the vertical blanking time.

6. A circuit as claimed in claim 1 wherein said auxiliary signals comprise consecutive signals.

7. A method comprising receiving a transmitted signal from a transmitter having a main transmission direction during an information content portion of said transmitted signal and two other directions symmetrical with respect to said main direction during an auxiliary signal portion distinct in time from said main signal portion, and producing an error signal from said auxiliary signals.

8. A method as claimed in claim 7 wherein said auxiliary signals comprise consecutive signals.

9. A method as claimed in claim 7 wherein said receiving step comprises receiving a television signal and receiving said auxiliary signals during successive line periods during the vertical blanking time.

10. A method as claimed in claim 9 wherein said auxiliary signals receiving step comprises receiving variations in the blanking signal from a fixed level.

* * * * *

UNITED STATES PATENT AND TRADEMARK OFFICE
CERTIFICATE OF CORRECTION

PATENT NO. : 3,997,901
DATED : December 14, 1976
INVENTOR(S) : JACQUES CLAUDE CAYZAC It is certified that error appears in the above-identified patent and that said Letters Patent are hereby corrected as shown below:

IN THE TITLE PAGE

Section [30] should read

--Foreign Application Priority Date

June 23, 1970    France    7023123

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*